Patented Sept. 1, 1925.

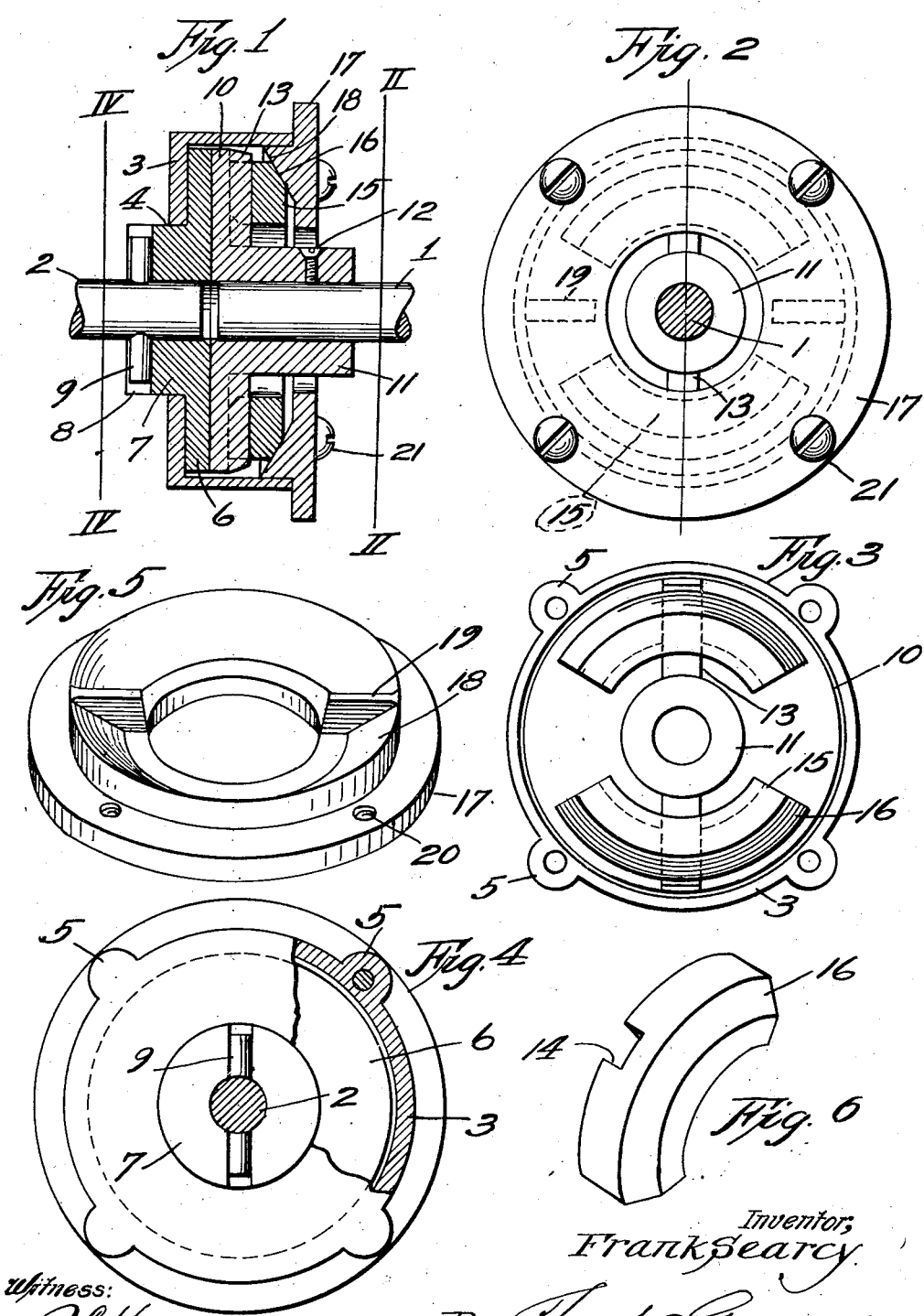

1,552,012

UNITED STATES PATENT OFFICE.

FRANK SEARCY, OF KANSAS CITY, MISSOURI, ASSIGNOR TO B. E. SIPE, OF KANSAS CITY, MISSOURI.

CLUTCH.

Application filed August 14, 1922. Serial No. 581,652.

*To all whom it may concern:*

Be it known that I, FRANK SEARCY, a citizen of the United States, residing at Kansas City, in the county of Jackson and State of Missouri, have invented a certain new and useful Improvement in Clutches, of which the following is a complete specification.

This invention relates to friction clutches, and has for one of its objects to produce a device of this character for transmitting power efficiently when the driving element attains a predetermined speed, and capacity for slipping in the event the resistance encountered is too great to be overcome by the driving element.

A further object is to produce a clutch for transmitting power noiselessly and which has no part susceptible of breakage or quick wear.

A still further object is to produce a simple, strong, durable and inexpensive clutch of the character mentioned and in order that it may be fully understood reference is to be had to the accompanying drawings, in which:—

Figure 1 is a central vertical section taken through the device and illustrates the same as it will appear in use.

Figure 2 is an end view of the same.

Figure 3 is a view similar to that of Figure 2, but with the cover plate removed.

Figure 4 is a section on the line IV—IV of Figure 1.

Figure 5 is a perspective view of one of the clutch elements.

Figure 6 is a perspective view of another clutch element.

In the said drawings where like reference characters identify corresponding parts in all of the figures, 1 and 2 respectively indicate the driving and driven shafts. 3 indicates the clutch housing open at one of its ends and partially open as at 4 at its other end and formed circumferentially with a series of threaded ears 5 for a purpose which will hereinafter appear.

Fitting within the housing and abutting the end thereof is a friction disc 6 which is preferably made of fiber, but which may be made of metal or other suitable material, said disc being provided with a hub portion 7 projecting through the opening 4 in the housing, said hub portion being formed with a transverse slot 8 in its end for the reception of a locking pin 9 passing through an opeing in the driven shaft 2, as illustrated most clearly in Figure 1.

Adapted to abut the flat face of friction disc 7, is a friction disc 10 which will preferably be of metal and is formed with a hub portion 11 fitted on the shaft 1 and held nonrotatably in position by means of a set screw 12 or in any other suitable manner, and also formed on its base with a pair of radial ribs 13 adapted to be received within a slot 14 formed on each of a pair of arcuate clutch members 15.

In this connection it is desirable to point out that the width of the clutch members 15 is such, that they are free for a limited sliding movement longthwise of the ribs 13 of the friction disc 10, and upon a predetermined speed of rotary motion being applied to said friction disc member, it will be apparent the clutch members will slide outwardly through centrifugal force. The outer face of each of the clutch members is bevelled as at 16.

The housing 3 is closed by means of a cover plate 17 which is formed with a wedge-shaped internal friction portion 18 adapted to be abutted by the bevelled faces 16 of the clutch members upon their outward travel under centrifugal force as hereinabove mentioned, said cover member also being formed with a pair of stiffening ribs 19 which at certain times will come into abutment with the clutch members as will be pointed out herebelow. The cover member is moreover provided with a series of perforations 20 for the reception of a series of screws 21 in threaded engagement with ears 5 of the housing 3.

In operation the device will function substantially as follows: Upon the rotation of the driving shaft 1, the friction disc 10 will rotate therewith, as it is fixed securely to the end of the shaft as illustrated and described. It will be apparent that under ordinary circumstances, one end of each of the clutch members 15 will come into contact with a rib 19 of the housing cover, and that the housing as a whole will be rotated at the same rate of speed as the shaft. Upon a predetermined increase of speed of the driving shaft 1, the clutch members 15 will move outwardly, the ribs 13 acting as guides, and will come into frictional engagement with the wedge face 18 of the cover plate as will be readily understood. As the speed increases said clutch members will tend to move still further outward and will increase the pressure on the cover plate tending to move the housing as a whole to the right, as shown in Figure 1, through engagement of the back of the housing 3 with the back of the friction disc 6, the slot 8 accommodating such movement of the friction disc, and will thus clamp the friction disc 6 tightly against the friction disc 10 and power will thus be transmitted from the shaft 1 to the shaft 2.

It is evident from the above that the faster the driving shaft rotates, the tighter the friction discs will be clamped together as an increase in speed in the driving shaft will cause an increase in centrifugal force, and, therefore, a tighter clamping together of the discs.

Should the driven shaft 2 encounter some obstruction which suddenly imposes an undue strain on the shaft, the friction disc 6 will slip over the face of the friction disc 10 and permit the motor to continue its rotation of the shaft 1 as will be readily understood, in other words the clutch will absorb any sudden shock or jars due to obstructions in the operation of the driven shaft 2 as will be readily understood.

It will be apparent from the above construction that the device is very simple and that there are few and minor wearing parts necessitating frequent replacement, and that the clutch, moreover, will be noiseless in character, as it is preferable to employ a metal friction disc in engagement with a fiber friction disc. It will also be evident that a device of this character is highly desirable in certain kinds of machinery, as the load imposed on the driving shaft will be gradually increased instead of suddenly as is now the case with certain types of clutches on the market.

From the above description it will be apparent that I have produced a device of the character set forth which possesses all of the features of advantage set forth as desirable and while I have described and claimed the preferred embodiment of the same, I reserve the right to make all changes properly falling within the spirit and scope of the appended claims.

I claim:—

1. The combination of a drive shaft and another shaft, adjacent disks rotatable with said shafts, and one of them slidable longitudinally on its respective shaft, toward the other disk. the fixed disk having radial guides, a pair of wedge clutch members slidable on said guides and rotatable with the disk thereof, and a housing inclosing the disks and slidable longitudinally of and spaced from the shafts and provided internally with an arcuate wedge portion adapted when engaged by the clutch members when slid outward by centrifugal force, to yield and cause the housing to clamp the disks firmly together for the transmission of power from the drive shaft to the other shaft; said housing being also formed with internal ribs adapted to cooperate with the segments in the rotation of such housing.

2. The combination of a drive shaft and another shaft, adjacent disks rotatable with the shafts, and one of them slidable longitudinally on its respective shaft, toward the other disk, a pair of wedge clutch members slidable radially of the rear face of the fixed disk, and a housing enclosing the disks and slidable longitudinally of and spaced from the shafts and formed internally with an arcuate wedge portion adapted when engaged by the clutch members when slid outward by centrifugal force, to yield and cause the housing to clamp the disks firmly together for the transmission of power from the drive shaft to the other shaft; said wedge clutch members and housing being so interlocked that rotation of the housing in response to rotation of the drive shaft is insured regardless of the position of radial adjustment of the clutch members.

In witness whereof I hereunto affix my signature.

FRANK SEARCY.